April 26, 1932.  J. A. DORNER  1,855,794
HEEL TRIMMING MACHINE
Filed Sept. 18, 1930  2 Sheets-Sheet 2
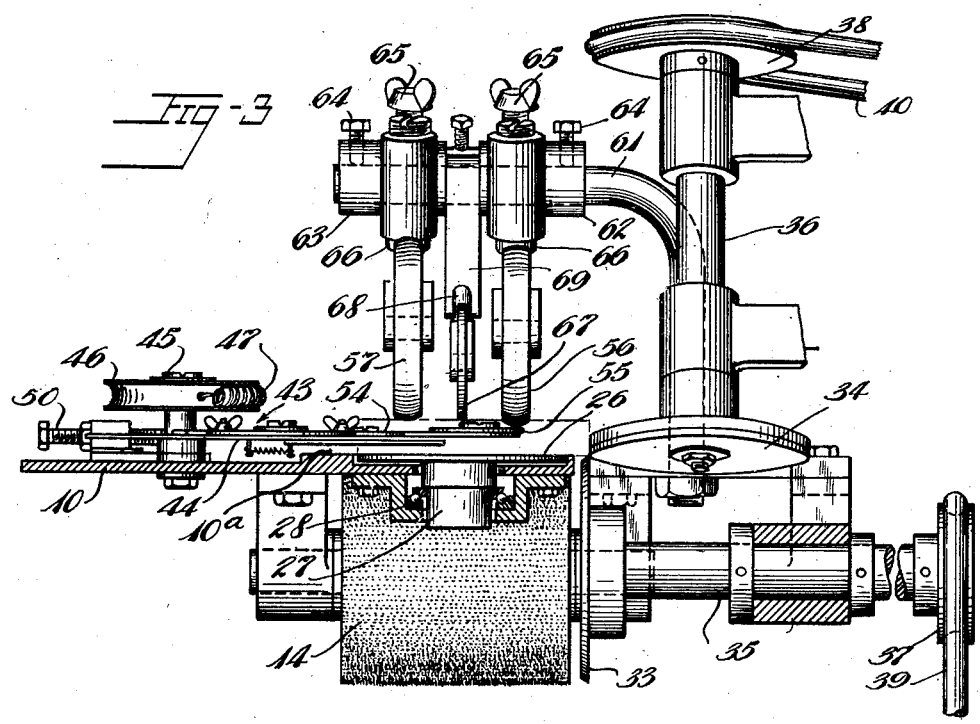
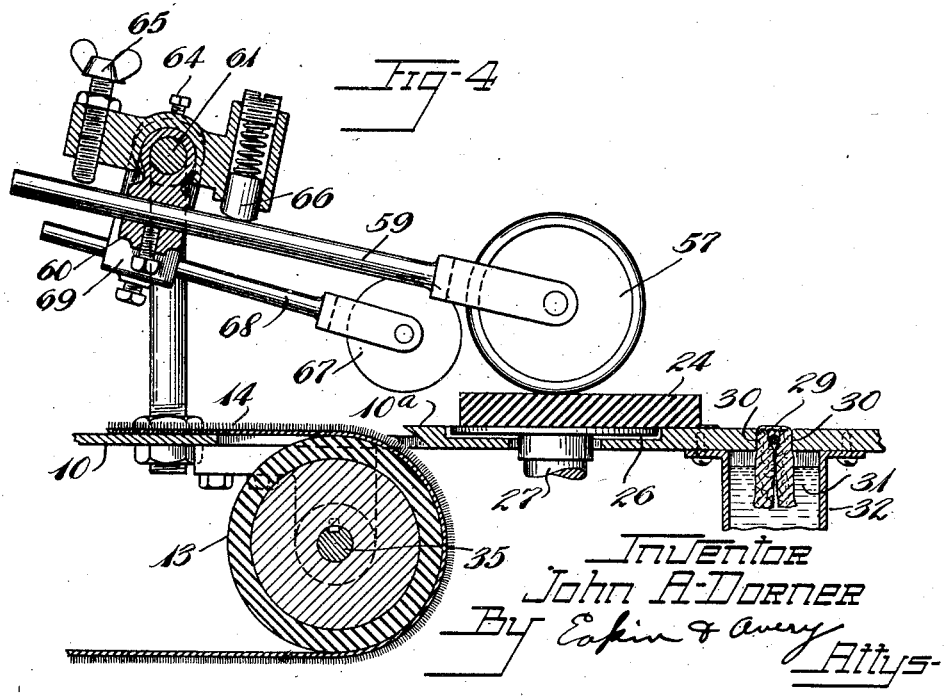
Inventor
John A. Dorner
By Eakin & Avery
Attys.

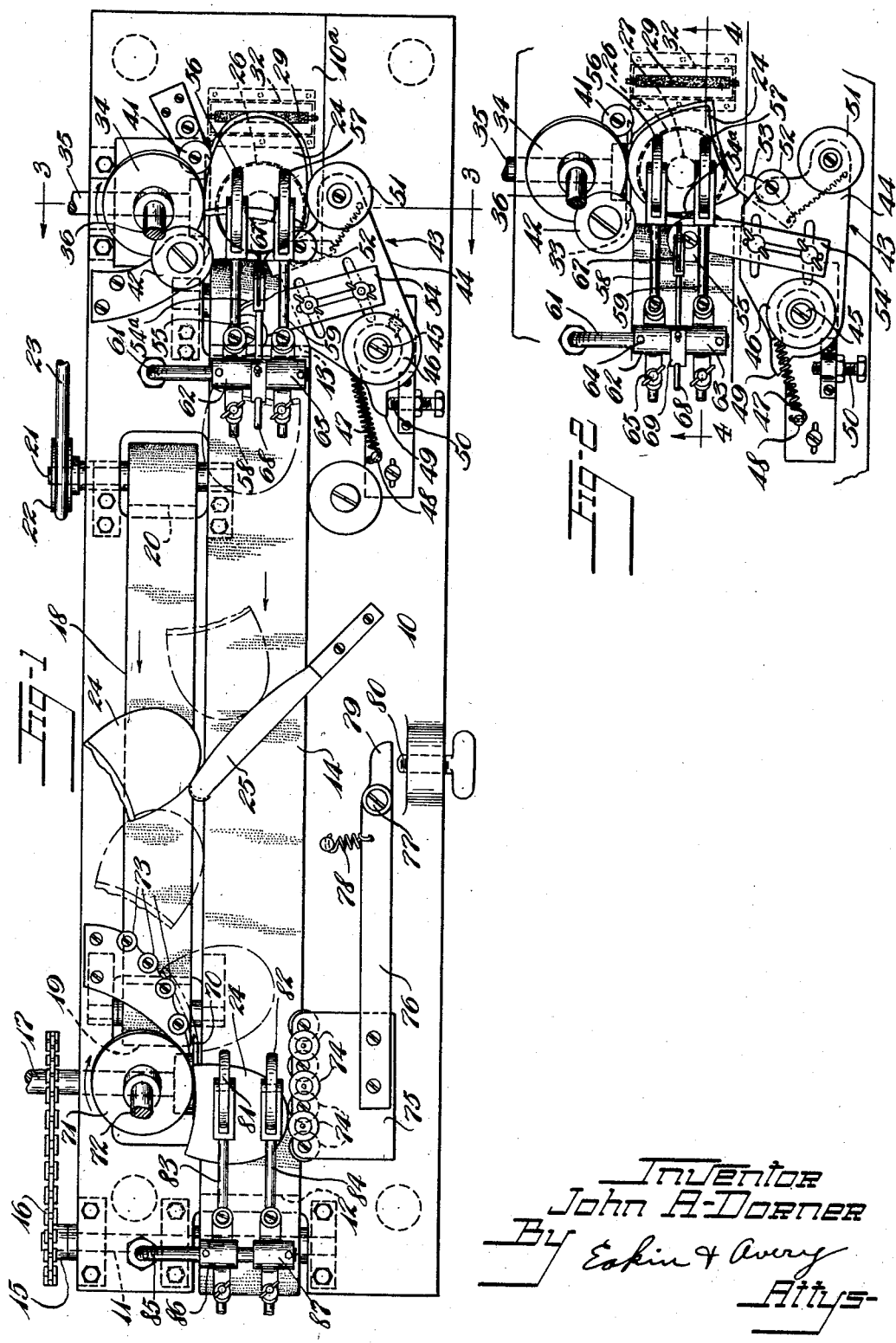

Patented Apr. 26, 1932

1,855,794

UNITED STATES PATENT OFFICE

JOHN A. DORNER, OF AKRON, OHIO, ASSIGNOR TO THE B. F. GOODRICH COMPANY, OF NEW YORK, N. Y., A CORPORATION OF NEW YORK

HEEL-TRIMMING MACHINE

Application filed September 18, 1930. Serial No. 482,762.

This invention relates to heel-trimming machines, and more especially to heel-trimming machines which automatically remove the overflow fins or rands from the perimeters of rubber heels. In some of its aspects the invention is an improvement upon the apparatus of my copending application, Serial No. 354,784, filed April 13, 1929.

The chief objects of the present invention are to provide improved heel-trimming apparatus which will be more positive in its action; and to provide such an apparatus adapted to manipulate the heels with greater facility and accuracy.

Of the accompanying drawings:

Fig. 1 is a plan view of a machine embodying my invention in its preferred form, and work at various positions therein.

Fig. 2 is a fragmentary plan view of the apparatus at an intermediate stage of the initial trimming operation.

Fig. 3 is a section on line 3—3 of Fig. 1.

Fig. 4 is a section on line 4—4 of Fig. 2.

Referring to the drawings, 10 is a table at one end of which, (the left end as viewed in Fig. 1) is journaled a drive-shaft 11 upon which is mounted a belt-pulley 12, and a similar pulley 13 is journaled adjacent the opposite end of the table and connected with the pulley 12 by a conveyor belt 14 which has its work-engaging surface at least composed of carding cloth, the upper reach of the belt 14 being supported by the top of the table 10. The drive shaft 11 is provided with a sprocket 15 driven by a sprocket chain 16 from a shaft 17 which is connected with any suitable power means (not shown).

A somewhat shorter conveyor belt 18, of the same material as the belt 14, is positioned adjacent and parallel to the latter at one side thereof and intermediate its ends, the belt 18 being mounted upon belt-pulleys 19, 20 of which the pulley 19 is suitably journaled beneath the table 10 and the pulley 20 is mounted upon a drive-shaft 21 journaled beneath said table and provided with a drive-pulley 22 connected by a driving belt 23 with a suitable source of power (not shown). The upper faces of the belts 14, 18 are disposed in the same horizontal plane and the belts are driven in the same direction at the same surface speed.

The work-receiving end of the machine is at the right as viewed in Fig. 1, and adjacent the end of the conveyor belt 14 thereat is heel-trimming mechanism adapted to sever the overflow rand from the convex marginal portions of molded rubber heels 24, 24 constituting the work, the heels being manually introduced into the machine at this point. The belt 14 engages the heels at the conclusion of the initial trimming operation and conveys them toward the delivery end of the machine, and an obliquely disposed deflector 25 extends transversely of the belt 14 for deflecting the work onto the belt 18. At the delivery end of the latter is trimming mechanism for removing the overflow rand from the concave breast portion of the heels as they are again deflected onto the belt 14, and the latter delivers the completely trimmed heels at the left end of the machine.

The initial rand-removing operation which removes the overflow from the convex portion of the margin of the heel starts at one corner of the heel and progresses to the opposite corner thereof. A rotary cutter is so positioned that it initially engages a corner of the heel when the latter is manually inserted, breast foremost, into the machine, and the friction of the cutter imparts to the heel a rotary movement, in its own plane, so that the perimeter of the heel is progressively presented to the cutter. The rotary movement of the heel 24 may be facilitated by a turntable 26 mounted upon a vertical spindle 27 journaled in a suitable bearing 28 beneath the table 10, the turntable being positioned immediately anterior to the belt 14 with its top face flush with the surface of a raised portion 10$^a$ (Fig. 4) on the table 10, the top of said raised portion being flush with the top of the conveyor belt 14. However, I find that I can dispense with the turntable if the heels are formed on their tread faces with raised buttons or bosses since such heels have less surface area in frictional contact with the underlying support.

For further reducing the friction between the work and the apparatus, I provide worklubricating means comprising a wick 29 which is threaded through a pair of adjacent parallel slots 30, 30 formed in the portion 10ª of the table 10 immediately anterior to the turntable 26 when the latter is used and in the same position when it is not used, the end portions of the wick being immersed in a bath of oil 31 contained in a suitable receptacle 32 secured to the under side of the table 10 beneath the slots 30. The oil 31 is of such character as not to be injurious to the work 24. The wick 29 projects slightly above the top face of the table 10 so as to engage and lubricate the bottoms of the heels as they are fed toward the initial trimming station.

The trimming mechanism at the work-receiving end of the apparatus comprises two rotatable cutting members 33, 34 having circular cutting edges disposed in different non-parallel planes, the intersection of which forms a chord on the cutter 33, the latter preferably having a beveled cutting edge as shown and the cutting edge of the member 34 being substantially cylindrical. The plane of the member 34 is slightly oblique with relation to the table top 10ª so that in cutting and feeding the work the member 34 exerts a downward force against the work in opposition to the upward force imparted by the cutter member 33. The cutter 33 is mounted upon a shaft 35 and the cutter 34 is mounted upon a shaft 36, the axes of said shafts being so disposed as not to intersect each other. The shafts 35, 36 are provided with respective belt pulleys 37, 38 and driven at the same speed by driving belts 39, 40 from a common source of power (not shown).

Positioned at each side of the cutters 33, 34, above the table 10, are guide-rollers 41, 42 guiding the work into and out of engagement with the cutters in proper position. On the opposite side of the turntable 26 and belt 14 from the cutters is mounted a mechanism generally designated 43 for yieldingly urging the work into operative engagement with the cutters, and for co-operation with the guide-roller 42 in guiding the work onto the belt 14.

The mechanism 43 comprises an arm or plate 44 pivotally mounted adjacent one of its ends at 45 and provided thereat with a coaxial, peripherally grooved pulley 46 which is fixed to the plate 44 and serves as a lever. A tension spring 47 is mounted in part of said groove and has one of its ends secured to the pulley and its other end secured to a stud 48 projecting from the table 10, the arrangement being such that the free end of the plate 44 is normally urged toward the cutter. The plate 44 is formed with a rearwardly projecting lug 49 adapted to engage an adjustable stop 50 for limiting the pivotal movement of the plate toward the cutter and for defining the normal inoperative position of the plate.

Pivotally mounted upon the marginal portion of the plate 44 at the free end thereof is a pair of guide-rollers or discs 51, 52 so positioned as successively to engage the margin of a heel 24 as the latter is rotated upon the turntable 26, as is clearly shown in Figs. 1 and 2. A spring tensioned finger 53 is pivotally mounted upon the plate 44 adjacent the disc 52 and projects beyond the margin of the plate to engage the breast portion of the heel as the latter rotates, as is clearly shown in Fig. 2. The arrangement is such that the finger 53 is permitted easily to retract and disengage itself from the heel 24 without scraping the heel or sliding upon it.

A bracket or arm 54 is adjustably mounted upon the plate 44 for adjustment in two directions, and a guide-roller or disc 55 is journaled on the outer end of said arm in position lastly to engage the heel 24 as the cutter completes the trimming of the convex portion of the heel. In order that the heel 24 by its rotary movement may swing the plate 44, against the tension of the spring 47, to bring the disc 55 into engagement with the heel, the arm 54 is so formed that the heel engages an arcuate edge of the arm before engaging the disc 55, and said arcuate edge either is knurled, or is provided with a layer 54ª of resilient friction material such as rubber for effecting such frictional engagement of the rotating heel 24 as to move the plate 44 angularly whereby the disc 55 is brought into engagement with the heel.

The pivoted mechanism 43 while progressively engaging the work as described, as the latter rotates, urges the work toward the cutter under the force of the spring 47 as is shown in Fig. 2. At the completion of the trimming of the convex portion of the heel the disc 55 alone is in engagement with the heel and the device 43 is so positioned as not to obstruct the course of the heel from the cutting position onto the belt 14. It will be observed with reference to Figs. 1 and 2 that the device 43 obstructs the movement of the heel toward the belt 14 at all times except at the completion of the trimming operation, and during a brief interval at the beginning of a trimming operation, before the heel engages the device.

In order that the work will feed smoothly past the cutter, and thereafter pass freely onto the belt 14, I provide a pair of holddown disc rollers 56, 57 which bear yieldingly against the upper face of the work, the roller 56 being positioned relatively close to the cutter and bearing upon the work with greater pressure than that of the roller 57, and the latter being on the opposite side of the axis of rotation of the work from the roller 56. The reason for the superior operation of apparatus having work-hold-down rollers arranged as described is somewhat obscure, but is believed to be that the roller 56, being between the point of application of the impelling force and the axis of rotation of the work, and bearing somewhat heavily against the deformable work and consequently having an elongated area of contact therewith, so resists rotation of the work while permitting forward feeding of the contacted portion thereof that the force of the cutter, applied at the end of a short lever arm from the roller, is predominantly effective to feed the work forward as a whole as distinguished from merely rotating it, while the first approximately straight side of the heel is being trimmed, so that the heel is not cramped against the roller 41, and, while the rear of the convex margin of the heel is being trimmed, the roller 56, by reason of its heavy pressure and its proximity to the cutter, apparently serves to compel forceful contact of the heel against the pivoted mechanism 43 so that the heel acts as a toggle link between the said mechanism and the cutter, for holding the heel in trimming relation to the cutter, the roller 56 then again causing the heel to feed forward adequately to avoid cramping of the heel against the roller 41 by its rotation as the last approximately straight margin of the heel is trimmed.

As the forward feeding of the work is resisted by the device 43, the work is forced to rotate, but upon an axis varying in position as the trimming action progresses along the non-circular margin. The toggle-like action of the heel causes the device 43 to turn on its pivot, the finger 53 being first engaged by the heel to initiate the turning movement of the device, until such time as the device 43 is clear of the forward path of the heel, whereupon the latter is fed forward from the cutter, with its convex margin foremost, onto the belt 14. The roller 57 apparently functions merely to steady the work and to assist the roller 56 in damping out or preventing vibration of the heel.

The rollers 56, 57 are journaled in the forked ends of respective arms 58, 59, and the latter are adjustably mounted in respective brackets such as the bracket 60, Fig. 4. The brackets 60 are journaled on the horizontal leg of an L-shaped support 61, the vertical leg of which is secured to the table 10. Mounted upon the support 61 and straddling each bracket 60 thereon are respective brackets 62, 63 which are secured against angular movement on the support by set screws 64, 64. Each bracket, 62 and 63 is provided at one side of the support 61, with a thumbscrew 65 which engages an arm 58 or 59, and on the other side of said support is provided with a spring-pressed plunger 66 engaging the same arm. The arrangement permits the rollers 56, 57 to be accurately adjusted so as to exert determinate differential yielding pressure upon the work.

Positioned between the arms 58, 59 and over the work-receiving end of the belt 14 is a disc roller 67 which is journaled in one end of an arm 68 the other end of which is adjustably mounted in a bracket 69, the latter being adjustably mounted for angular movement upon the support 61 between the brackets 62, 63. The roller 67 is adapted lightly to engage the upper face of the work as the leading edge of the latter is fed onto the belt 14 so as to assure sufficient driving friction to pull the work completely onto the belt after it has passed out of engagement with the cutter.

Positioned at the delivery end of the conveyor belt 18 is a cutter for removing the overflow rand from the breast portion of the rubber heels 24, said cutter consisting of two rotatable cutting members 70, 71 similar in design and arrangement to the cutting members 33, 34. The member 70 is mounted upon the shaft 17 and the member 71 is mounted upon a shaft 72 driven by suitable driving means at the same speed as the shaft 17. The members 70, 71 intersect each other close to the belt 14, and an arcuate series of guide-rollers 73, 73 is positioned above the belt 18 for intercepting the heels 24 thereon and for guiding them in an arcuate course, parallel to the arcuate margin of their breast portions, into engagement with the cutting members 70, 71, whereby the overflow rand is progressively severed from said breast portions.

For yieldingly urging the heels 24 into operative engagement with the cutting members 70, 71 I provide an aligned series of presser rollers or discs 74, 74 journaled on a suitable plate-support 75 mounted upon one end of a lever-arm 76, the latter being pivotally mounted at 77 on the table 10 and connected to a tension spring 78 which urges the free end of the lever-arm and the discs 74 toward the conveyor 14 so that said discs yieldingly engage successive heels 24 and hold them in operative relation to the cutter to be trimmed thereby. The lever-arm 76 is formed on the opposite side of its pivot 77 with an extension 79 adapted to abut an adjustable stop 80 for defining the normal inoperative position of the lever-arm.

To assure the smooth passage of the work past the cutting members 70, 71 without vibration, a pair of presser disc-rollers 81, 82 similar to the rollers 56, 57, are mounted side by side above the belt 14 at the trimming position, and bear lightly upon the work with equal pressure. The rollers 81, 82 are journaled in the forked ends of respective arms 83, 84 which are carried by suitable brackets (not shown) mounted upon the horizontal leg of an L-shaped support 85, the latter being mounted upon the table 10. Respective brackets 86, 87, identical with the brackets 62, 63 are mounted upon the support 85 and engage the arms 83, 84 in the same manner as the brackets 62, 63 engage the arms 58, 59, for determinately positioning the rollers 81, 82 with relation to the work.

The operation of the machine will be apparent from the foregoing description of the apparatus. Heels are manually fed into the machine at the work-receiving end thereof and thereafter are automatically completely trimmed and delivered from the opposite end of the machine.

My invention may be modified within the scope of the appended claims, as I do not limit the claims wholly to the specific embodiment shown and described.

I claim:

1. In a machine of the character described, the combination of a cutter, and driving means comprising card cloth for feeding work into and out of operative association with the cutter.

2. A combination as defined in claim 1 including hold-down means adapted to engage the work adjacent the cutter to increase the driving friction between the work and the card cloth.

3. In a trimming machine, the combination of a cutter, and an endless conveyor belt comprising card cloth for feeding work past the cutter to be trimmed thereby.

4. A combination as defined in claim 3 including a presser roller adapted to engage the work adjacent the cutter to increase the driving friction between the work and the conveyor belt.

In witness whereof I have hereunto set my hand this 13th day of September, 1930.

JOHN A. DORNER.